(12) United States Patent
Kruecker et al.

(10) Patent No.: US 11,562,665 B2
(45) Date of Patent: Jan. 24, 2023

(54) TUMOR ABLATION TRAINING SYSTEM

(75) Inventors: Jochen Kruecker, Washington DC, DC (US); Sheng Xu, Rockville, MD (US); Sandeep Dalal, Cortlandt Manor, NY (US); Bradford Johns Wood, Potomac, MD (US)

(73) Assignees: KONINKLIJKE PHILIPS N.V., Eindhoven (NL); THE UNITED STATES OF AMERICA, AS REPRESENTED BY THE SECRETARY, DEPARTMENT OF HEALTH AND HUMAN SERVICES, Bethesda, MD (US)

( * ) Notice: Subject to any disclaimer, the term of this patent is extended or adjusted under 35 U.S.C. 154(b) by 3474 days.

(21) Appl. No.: 13/378,412

(22) PCT Filed: May 14, 2010

(86) PCT No.: PCT/IB2010/052153
§ 371 (c)(1),
(2), (4) Date: Dec. 15, 2011

(87) PCT Pub. No.: WO2011/001299
PCT Pub. Date: Jan. 6, 2011

(65) Prior Publication Data
US 2012/0189998 A1    Jul. 26, 2012

Related U.S. Application Data

(60) Provisional application No. 61/221,126, filed on Jun. 29, 2009.

(51) Int. Cl.
*G09B 23/28*    (2006.01)

(52) U.S. Cl.
CPC .................. *G09B 23/286* (2013.01)

(58) Field of Classification Search
CPC ................................ G09B 23/286
(Continued)

(56) References Cited

U.S. PATENT DOCUMENTS 9,144,461 B2   9/2015  Kruecker
9,747,684 B2   8/2017  Trovato
(Continued)

FOREIGN PATENT DOCUMENTS

CN    2587369 Y    11/2003
CN    2710073 Y     7/2005
(Continued)

OTHER PUBLICATIONS

Khajanchee, Y.S., et al. A Mathematical Model for Preoperative Planning of Radiofrequency Ablation of Hepatic Tumors. Surgical Endoscopy. Mar. 2004. pp. 696-701.
(Continued)

*Primary Examiner* — Robert P Bullington
*Assistant Examiner* — Stephen Alvesteffer
(74) *Attorney, Agent, or Firm* — Sherry Austin

(57) ABSTRACT

A training system and method includes a subject phantom (102) capable of being visualized on a display (120). A spatial tracking system (104) is configured to track an interventional instrument (108) in subject phantom space. A simulation system (110) is configured to generate a simulated abnormality in the phantom space and to simulate interactions with the simulated abnormality to provide feedback and evaluation information to a user for training the user in an associated procedure related to the abnormality.

20 Claims, 4 Drawing Sheets

(58) Field of Classification Search
USPC .......................................................... 434/272
See application file for complete search history.

(56) References Cited

U.S. PATENT DOCUMENTS

| | | | |
|---|---|---|---|
| 2003/0078490 A1 | 4/2003 | Damasco et al. | |
| 2005/0032028 A1 | 2/2005 | Chosack et al. | |
| 2005/0041843 A1* | 2/2005 | Sawyer | G06T 7/0012 382/128 |
| 2005/0058326 A1* | 3/2005 | Barth | A61B 6/032 382/128 |
| 2007/0073137 A1* | 3/2007 | Schoenefeld | A61B 90/36 600/407 |
| 2007/0167808 A1 | 7/2007 | Nozaki | |
| 2008/0085499 A1 | 4/2008 | Horvath | |
| 2008/0187896 A1* | 8/2008 | Savitsky | G09B 23/288 434/272 |
| 2009/0221999 A1* | 9/2009 | Shahidi | A61B 18/18 606/33 |
| 2009/0259123 A1* | 10/2009 | Navab | G01T 1/161 600/424 |

FOREIGN PATENT DOCUMENTS

| | | |
|---|---|---|
| CN | 201156345 Y | 11/2008 |
| JP | H05123327 | 11/1991 |
| JP | 2007215672 | 8/2007 |
| WO | WO2008122006 | 10/2008 |

OTHER PUBLICATIONS

Rehrig, S.T., et al. Integrating Simulation in Surgery as a Teaching Tool and Credentialing Standard. The Society for Surgery of the Alimentary Tract. Nov. 2007. pp. 222-233.

Dodd G. D. et al., "Radiofrequency Thermal Ablation: Computer Analysis of the Size of the Thermal Injury Created by Overlapping Ablations," American Journal of Roentgeneology, vol. 177, pp. 777-782, Oct. 2001.

Krücker J. et al., "Electromagnetic Tracking for Thermal Ablation and Biopsy Guidance: Clinical Evaluation of Spatial Accuracy", Journal of Vascular and Interventional Radiology, vol. 18, Issue 9, pp. 1141-1150, 2007.

Roberts K. E. et al., "Evolution of Surgical Skills Training", Worid J Gastroenterol, vol. 12, No. 20, pp. 3219-3224, May 2006.

Gorman P. J. et al., "The Future of Medical Education is No Longer Blood and Guts, it is Bits and Bytes," The American Journal of Surgery, vol. 180, pp. 353-356, 2000.

Powers K. rt al., "Simulated Laparoscopic Operating Room Crisis: An Approach to Enhance the Surgical Team Performance," Surgical Endoscopy, vol. 22, pp. 885-900, 2008.

Gould D. et al., "SIR/RSNA/CIRSE Joint Medical Simulation Task Force Strategic Plan Executive Summary", Journal of Vascular and Interventional Radiology, vol. 18, pp. 953-955, 2007.

Gould D. A. et al., "Interventional Radiology Simulation: Prepare for a Virtual Revolution in Training", Journal of vascular and Interventional Radiology (JVIR), vol. 18, Issue 4, pp. 483-490, Apr. 2007.

Glaiberman C. B. et al., "Simulation in Training: One-year Experience Using an Efficiency Index to Assess Interventional Radiology Fellow Training Status", Journal of Vascular and Interventional Radiology, vol. 19, No. 9, pp. 1366-1371, 2008.

* cited by examiner

TUMOR ABLATION TRAINING SYSTEM

This invention was made in the performance of a Cooperative Research and Development Agreement with the United States Public Health Service (CRADA No. NCI-NIHCC-01864). The Government of the United States has certain rights in the invention.

This disclosure relates to medical training systems, and more particularly to guided interventional device training systems and methods for surgical procedures.

Ablation procedures are being performed in increasing numbers to eradicate small to midsize tumors in a minimally invasive way. However, ablation procedures that require more than one ablation to create a thermal lesion large enough to cover a planning target volume (PTV), which includes a tumor and a surgical margin region thereabout, are difficult to perform. This difficulty arises out of the fact that the ablation procedures require extraordinary skill in mentally visualizing spatial relationships of the three dimensional geometry of the PTV, the individual ablation zone shape, and nearby tissue that must not be damaged by the ablation. Extraordinary skill is also needed for mentally planning how the PTV is ideally covered with multiple ablations, and manually positioning an ablation needle such that the mentally planned procedure is executed, under the guidance of ultrasound, computer tomography (CT) or magnetic resonance imaging (MRI). No known training systems exist to help (interventional) radiologists acquire and refine these skills.

Ablation procedures such as radio frequency ablation (RFA) have been performed in increasing numbers in recent years as an alternative to more invasive surgical procedures. During RFA, an electrode with un-insulated tip is inserted into a tumor or lesion to be ablated under ultrasound, CT or MRI guidance. When the electrode is placed, a radio frequency current is applied to the tip which creates tissue heating and cell death above 60° Celsius. In order to destroy tumors that are larger than the volume around the heated needle tip and destroyed in a single ablation, the needle tip needs to be repeatedly repositioned to ablate different parts of the tumor, by partly overlapping the regions of treatment. This process needs to be repeated until the entire tumor is covered by the set of ablations, also referred to as a "composite ablation".

Currently, these composite ablations are performed without navigation assistance and without quantitative or computerized planning and thus depend on the intuition and experience of the physician. The process of composite ablation planning and execution is difficult, and it has been pointed out that full coverage of a planning target volume (PTV) with (smaller) individual ablations generally requires a surprisingly large number of ablations.

Thus, there is no guarantee that a "mentally planned" composite ablation actually fully covers the PTV, or that it covers the PTV in an optimal fashion, i.e. with the minimum number of ablations (e.g., each ablation taking between 12 and 20 minutes). Further, due to inaccuracies in executing (i.e., placing the ablation probes) the "mental plan", the PTV coverage actually achieved may be insufficient to eradicate the tumor, leading to local tumor recurrence.

Physicians receive training in procedures such as RFA as part of their interventional radiology specialization in a "Master-Apprentice Training Model", by performing procedures on actual patients, jointly with and under the mentorship of experienced interventional radiologists. However, the number of procedures performed as part of this training is limited, leading to significant skill differences between recently trained and long-term practitioners of RFA. It would be advantageous to provide alternative training systems and methods to better prepare technicians and physicians for surgical procedures.

In accordance with the present principles, it has been recognized that simulation represents a valuable alternative to using patients as hands-on training material for care providers. Simulations improve patient safety by moving the learning phase away from patients, and practicing manual skills or procedural steps involved in a discrete medical procedure in an environment without risk to patients. In accordance with the present embodiments, a system and method for simulating and training the planning and execution of RFA procedures is provided. An illustrative system uses a spatial tracking system to combine actual imaging and needle placement in phantoms with virtual reality overlays to provide a realistic simulation of the ablation experience and quantitative feedback on the quality of the ablations executed by the trainee.

The present principles overcome the limitations of the "Master-Apprentice Training Model". The "Master-Apprentice Training Model" limitations include having only a limited number of procedures that are executed as part of the training, having significant time requirements for the mentor, and for other medical personnel. Further, patients involved in procedures carried out during training may have potential risk due to inexperienced practitioners and their lack of quantitative assessment of the technical skills acquired during training.

For RFA and other ablation procedures, the present principles overcome the lack of training of 3D geometry visualization skills and promote skills such as determining the size and shape of the PTV, relative to size, shape, and orientation of individual ablation lesions; sculpting larger ablation lesions of adequate size/shape by overlapping several individual ablations; providing the ability to practice ultrasound and/or CT guidance to deploy multiple needles (sequentially or simultaneously) into a planned geometric arrangement; providing quantitative feedback on how well a given PTV was covered by the executed set of individual ablations; finding a number of ablations needed for coverage compared to optimal coverage with a minimum number of ablations; determining un-covered and thus under-treated volumes or fraction/percentage progress tracking for each trainee based on all quantitative measures, etc. Also, for ablation training, the duration of each procedure is greatly reduced, and thus more procedures can be performed during training, because actual ablations require, e.g., 12 to 20 minutes for each individual ablation, whereas simulated ablations (SAs) can be performed instantaneously.

A training system includes a subject phantom configured for simulating a procedure and occupying a space capable of being visualized on a display. A spatial tracking system is configured to track an interventional instrument (108) in subject phantom space. A simulation system is configured to generate a simulated abnormality in images of the phantom space and to simulate interactions with the simulated abnormality to provide feedback and evaluation information to a user for training the user in an associated procedure related to the abnormality.

A system for simulating aspects of an interventional ablation procedure includes a tissue-mimicking phantom compatible with ultrasound imaging. A spatial tracking system is configured to track a pose of at least one of an ultrasound probe and a needle probe. A computer workstation is configured to run software. The software is configured to acquire, process and display images from an ultrasound scanner in real-time, create and visualize in real-time virtual tumors in ultrasound images, and spatially track positions of the ultrasound probe and the needle probe relative to the virtual tumors visualized jointly with the image such that a simulated ablation performed at a location of the needle probe is visually displayed to provide training feedback for a user.

A surgical training method includes simulating an abnormality in subject phantom space; spatially tracking an interventional instrument in the subject phantom space; performing a virtual procedure by simulating and displaying interactions between the interventional instrument and the abnormality simultaneously on a display; and providing feedback and evaluation information to a user for training the user in the virtual procedure.

These and other objects, features and advantages of the present disclosure will become apparent from the following detailed description of illustrative embodiments thereof, which is to be read in connection with the accompanying drawings.

This disclosure will present in detail the following description of preferred embodiments with reference to the following figures wherein.

Figure 1:
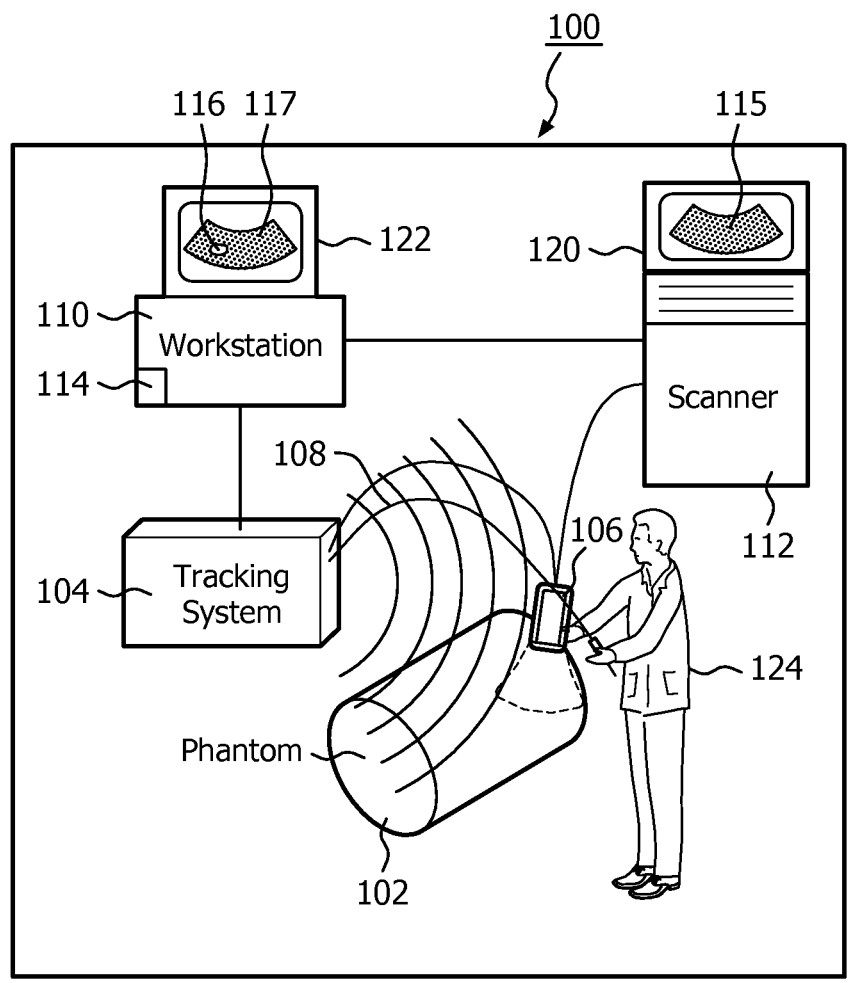
FIG. 1 is a system diagram showing a training system for simulating ablation procedures in accordance with the present principles.

The present disclosure describes training systems and methods for interventional procedures. The interventional procedures may include any number of procedures, but will illustratively be described in terms of tumor ablation. However, the teachings of the present invention are much broader and are applicable to any surgical or computer guided operation. A system and method for simulating aspects of performing an interventional ablation procedure, configured to enable the development of technical skills necessary to perform ablation procedures accurately and effectively, is disclosed and described.

The present principles provide training for technical skills needed for ablation procedures (e.g., 3D visualization, planning, needle positioning). These skills can be acquired and trained in a simulated environment, independent of actual patients. Embodiments combine actual, physical components (tissue phantom, ultrasound scanner) with simulated components (virtual tumors, simulated ablations) to provide a realistic user experience in a simple and efficient manner.

The elements depicted in the FIGS. may be implemented in various combinations of hardware and software and provide functions which may be combined in a single element or multiple elements. Furthermore, the present principles can take the form of a computer program product accessible from a computer-usable or computer-readable medium providing program code for use by or in connection with a computer or any instruction execution system. A computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The processor or processing system may be provided with the scope system or provided independently of the scope system. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a training system 100 for teaching surgical ablation techniques or the like is illustratively shown. System 100 comprises hardware and software components. A tissue-mimicking phantom 102, compatible with ultrasound, CT imaging or other imaging is provided to simulate media (e.g., a human body) for carrying out a procedure. A spatial tracking system 104 is configured to track a pose of a probe 106 (e.g., an ultrasonic probe, although other scanning instruments and techniques may be employed) and an interventional device or instrument 108 (e.g., RFA needle probe, catheter, biopsy needle, etc.). A workstation 110 runs software 114 and includes hardware to acquire, process and display (in real-time) images from the scanner 112 (e.g., an ultrasonic scanner, a CT scanner, MRI scanner, etc.).

The workstation 110 also creates and visualizes in real-time "virtual tumors" (VTs) 116 (e.g., 3D shapes of configurable size and shape) in a configurable pose relative to and superimposed on ultrasound and/or CT images 117. The workstation 110 includes software 114 to spatially track and display the position of an ultrasound probe 106 and an interventional device (e.g., RFA needle probe) 108 relative to an image 117 and any "virtual tumors" (VTs) 116 visualized jointly with the CT image 117. Phantom images 115 and combined images 117 are rendered on display(s) 120 and 122, or both images may be rendered on a single display.

The workstation 110 computes and visualizes the 3D shape of a configurable "simulated ablation" (SA) performed at the location of the tip of the RFA needle probe 108; computes and visualizes a fraction of the VT 116 that was covered by the SA, and a fraction of "healthy tissue" (i.e. tissue outside VT 116) that was covered by the SA. The workstation 110 records and provides feedback on the number of SAs performed, the duration of the procedure, the volume and percentage of the VTs covered, the volume of "healthy tissue" covered. The workstation 110 is further employed to determine an optimal plan to cover a VT with SAs (e.g., using known methods), compare the optimal plan with the actual SAs performed, and provide feedback to an operator 124 based on the comparison (e.g., a score, level or rating).

The system 100 has a spatial tracking system 104 (such as an electromagnetic (EM) tracking system or other system), which is interfaced with the workstation 110, the needle 108, the scanner 112 and the probe 106 such that the tracking system 104 acquires a spatial pose of the needle 108 and probe 106 relative to the tissue-mimicking phantom 102 and permits processing of these spatial poses by the workstation 110. The workstation 110 includes software 114 and hardware to run an "Ablation Training Program".

Figure 2:
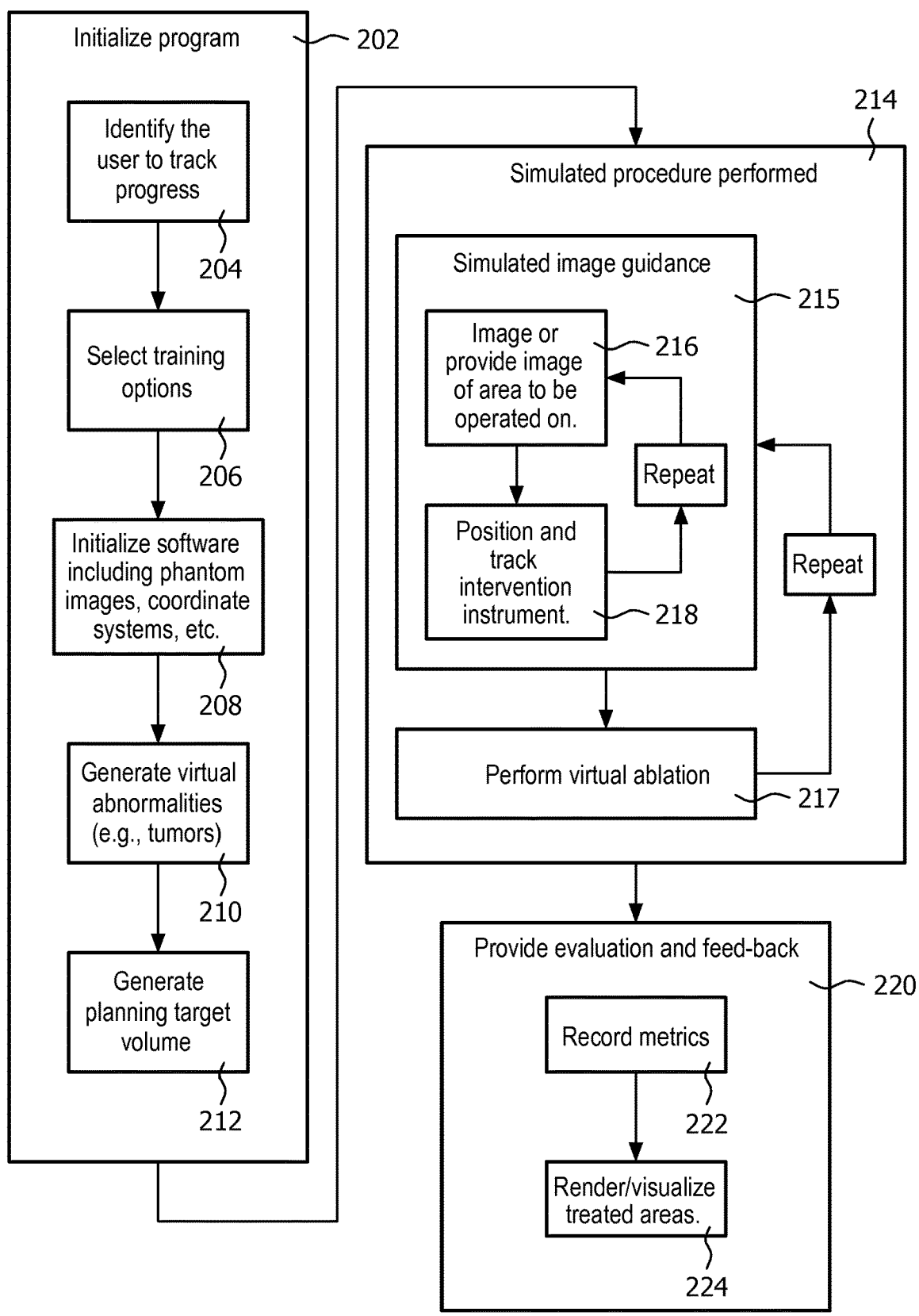
FIG. 2 is a block/flow diagram showing a system/method for training users for a surgical procedure (e.g., an ablation procedure) in accordance with the present principles.

Referring to FIG. 2, the program 114 preferably includes the following functions and steps. In block 202, an initialization of the program is performed. In block 204, an optional step includes identifying a user (to keep track of training progress). In block 206, an optional step includes selecting training options. These options may include, e.g., a type of phantom used (e g mimicking different body parts/organs), a level of difficulty, a size of tumor, etc. In block 208, a general software initialization includes loading/displaying pre-acquired CT (or other modality) image of the phantom used, loading a registration transformation between the phantom (in the coordinate system of the tracking system) and the image of the phantom. In block 210, a virtual abnormality (e.g., tumor(s)) is generated. This may include manual or automatic/random selection of a tumor location, tumor shape, size, and orientation, e.g., spherical, ellipsoidal, arbitrary pre-defined shape.

In block 212, a manual or automatic definition of a planning target volume (PTV) is provided. The Planning Target Volume (PVT) equals the tumor(s) plus a pre-defined (e.g., 1 cm) or manually defined surgical margin around each tumor. In block 214, a simulated procedure (e.g., a simulated composite ablation) is performed.

In block 215, simulated image guidance is provided by the system. In block 216, the area to be operated on is imaged or provided as an image. For example, the user employs an ultrasonic probe (USP) to guide a needle toward a desired location for an "ablation" in or near a virtual tumor. Instead of using an ultrasound image displayed on an ultrasound scanner for guidance, the user may employ an image displayed on a workstation display, which obtains an original ("raw") image in real-time from the ultrasound scanner (e.g. via video frame-grabbing), and displays this original image superimposed with additional information. The additional information may include a spatially corresponding cross-section of the virtual tumor to simulate the ultrasound visualization of a tumor in a phantom image. In block 218, the interventional instrument (e.g., a needle or tool) is positioned and tracked. When the user has positioned the needle at the desired location, the user triggers the software to perform the next "simulated ablation" in block 217. The user repeats blocks 216 and 218 until the instrument or needle is properly placed. When at an appropriate location, the user performs a simulated ablation in block 217. Blocks 215 and 217 are repeated until the PTV is "fully ablated" by the user's estimation, e.g., the PTV is covered by the simulated ablations. The union of the simulated ablations is the "Simulated Composite Ablation" (SCA). The image may be updated in accordance with the actions performed during the procedure, e.g., ablated areas may be displayed through color or texture changes. Other image changes may also be employed.

In block 220, evaluation and feedback are provided to the user (e.g., a score, progress chart, etc.). In block 222, the software employed will record and visualize performance metrics such as: a number of simulated ablations, a total time, a volume/percentage of PTV not covered by any simulated ablations (SAs), a volume of non-PTV tissue ("healthy tissue") covered by SAs, etc. Optionally, the software may compute and visualize treated areas, such as an optimal composite ablation for comparison with the manually achieved SCA, in block 224. To compute the optimal composite ablation, different methods may be employed depending on the procedure, the type of abnormality, lesion, etc.

Figure 3:
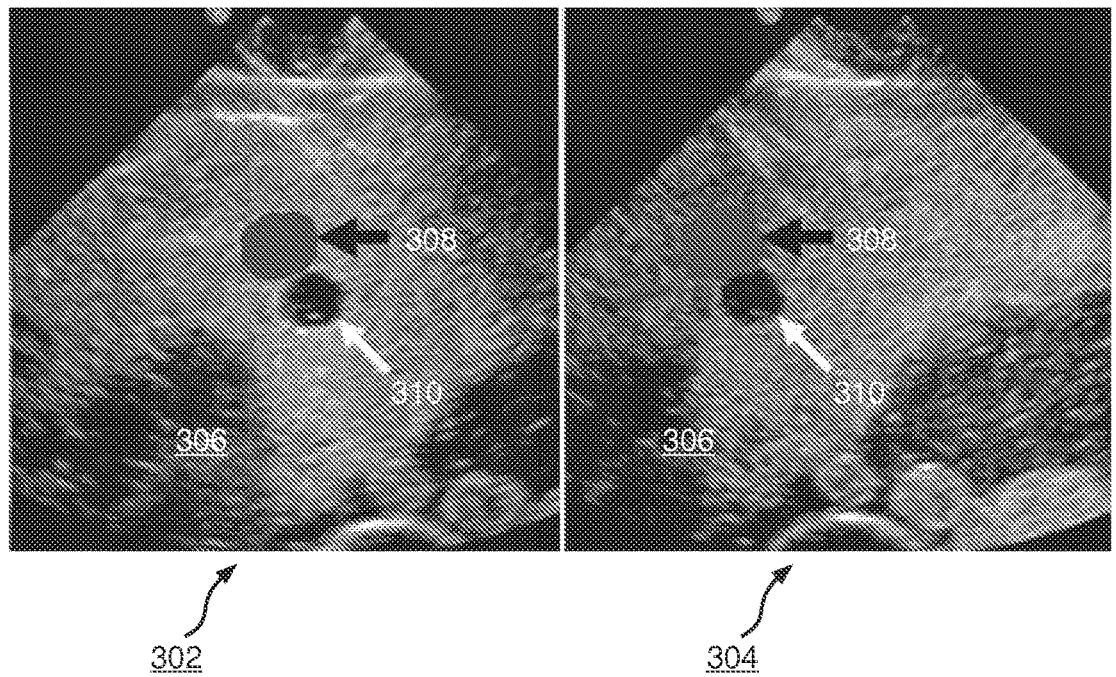
FIG. 3 shows illustrative sonogram images showing a virtual tumor disposed in phantom space in accordance with the present principles.

Referring to FIG. 3, screenshots 302 and 304 from an actual implementation of a visualization process are illustratively depicted. Screenshots 302 and 304 are provided for a video frame-grabbed ultrasound image of a tissue-mimicking phantom 306 onto which a virtual tumor (VT) 308 has been superimposed using a method described in the present disclosure. The VT 308 was generated in a location close to an actual cystic lesion 310 in the phantom 306. As the ultrasound probe is physically translated from the pose in image 302 to the pose in image 304, the VT 308 is automatically translated a corresponding distance based on the spatial tracking of an ultrasonic probe, giving the impression that the VT 308 is in a fixed location relative to the phantom 306.

VTs 308 are generated by defining a position and orientation of a 3D shape (e.g., sphere, ellipsoid, etc.) in a coordinate system of an image (e.g., CT, MRI, etc.) of a phantom used. VTs 308 are visualized during the simulation. For each ultrasound image acquired from an ultrasound scanner, the spatially tracked and calibrated ultrasound probe and registration between the phantom image 306 and a tracking system are employed to determine a 2D intersection (IS) of the 3D shape of the VT 308 with a current 2D ultrasound image plane in phantom 306. Next, a position of the IS relative to the ultrasound image is determined, and the IS is visualized jointly with the ultrasound image using a workstation, e.g., by super-imposing the IS onto the image, alpha-blending, showing the outline only, etc.

Figure 4:
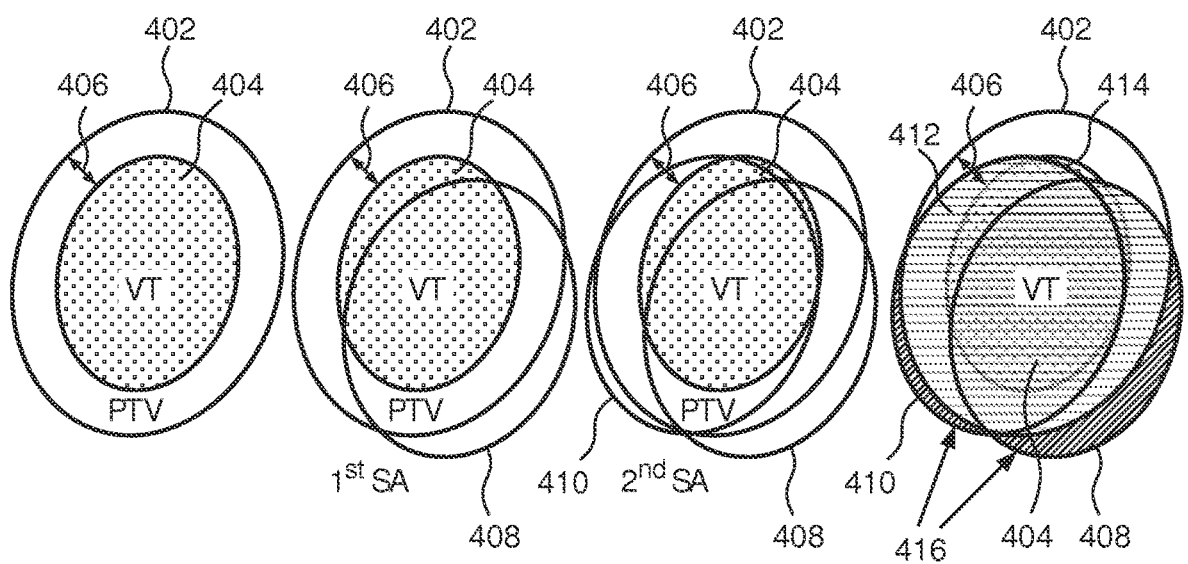
FIG. 4 is a diagram showing a series of images of a virtual tumor with a planned target volume, and simulated ablation regions and depicting feedback information regarding damaged healthy tissue and unablated tumor tissue in accordance with the present principles.

Referring to FIG. 4, for purposes of training in accordance with the present principles, a PTV 402 is defined as a virtual tumor (VT) 404 plus a surgical safety margin 406. Each individual simulated ablation (SA) 408 and 410 in this example may only cover part of the PTV 402. The software keeps track of the combined effect of all SAs performed, in terms of (1) a volume/fraction 412 of the PTV that was ablated (as desired), (2) a volume/fraction 414 of the PTV that was not ablated (risk of cancer recurrence), and (3) a volume of the "outside tissue" which is "healthy tissue" 416 that was ablated and thus destroyed as a side-effect of the treatment.

In the Simulated Ablation execution, the user triggers the execution of a SA whenever the user considers the needle probe to be placed appropriately (by turning a switch, pressing a button, or other mechanical trigger). A software program 114 (FIG. 1) then generates a 3D shape in the coordinate system of the phantom image, at the current location of the needle tip or some pre-defined offset from that needle tip, with an orientation defined by the current orientation of the needle. The shape can be a sphere, ellipsoid or some other shape that represents the expected ablation shape of actual medical ablation systems used in clinical practice, such as a Valleylab Cool-tip™ (Tyco Healthcare Group™), an RF 3000 (Boston Scientific™), or a Model 1500x (RITA Medical Systems™).

The software 114 can then temporarily visualize the ablation, simulating the (transient) generation of a gas bubble cloud in the tissue during, e.g., radio frequency ablation (RFA), by calculating an intersection of the SA shape (ISA) with a current ultrasound image, and visualizing the ISA jointly with the current ultrasound image for the visualization of the VT. The software 114 determines and records throughout the training procedure: the 3D-intersection of the SA with the PTV and with tissue outside the PTV, the volume 412 inside the PTV not covered by any SA (PTV not ablated), the volume 414 inside the PTV covered by at least one SA (PTV ablated), and the volume 416 outside the PTV covered by at least one SA ("healthy tissue" ablated).

Referring again to FIG. 1, the training system 100 may employ ablation with a guidance system other than with ultrasound guidance. For example, a CT system or an MRI system may be employed. The system 100 can be modified to simulate ablations performed with intermittent or fluoroscopic CT-image guidance, instead of ultrasound guidance. For both intermittent or fluoroscopic CT, the system 100 can keep track of and provide as feedback, an amount of simulated radiation dose to the patient, and an amount of contrast agent used.

For intermittent CT guidance simulation: The 3D shape of the VT 116 is visualized—in its pre-defined location—jointly with the actual CT image of the phantom 117. The visualization can be in 2D (e.g., multi-planar reconstructions (MPRs) of the CT image jointly with the corresponding intersection of the VT) or in 3D (surface or volume renderings, maximum intensity projections or other 3D visualization techniques). For joint visualization of the VT and the phantom image, 2D or 3D visualization of the image and the VT can be processed separately (2D: MPRs, 3D: rendering), or voxels in the image that are inside the shape of the VT can be modified (e.g. set to a higher/lower values) right after definition of the position/orientation of the VT. All subsequent 2D/3D visualization is then based on this modified image.

In accordance with one embodiment, whenever the user has manipulated the needle position and is ready to "take a CT scan", the software 114 is triggered to simulate a new CT scan. The tracked needle position is used to simulate the visualization of the needle 108 in the phantom image 117 (in addition to the VT 116). Whenever the user is ready to simulate performing an ablation, a SA is performed.

Figure 5:
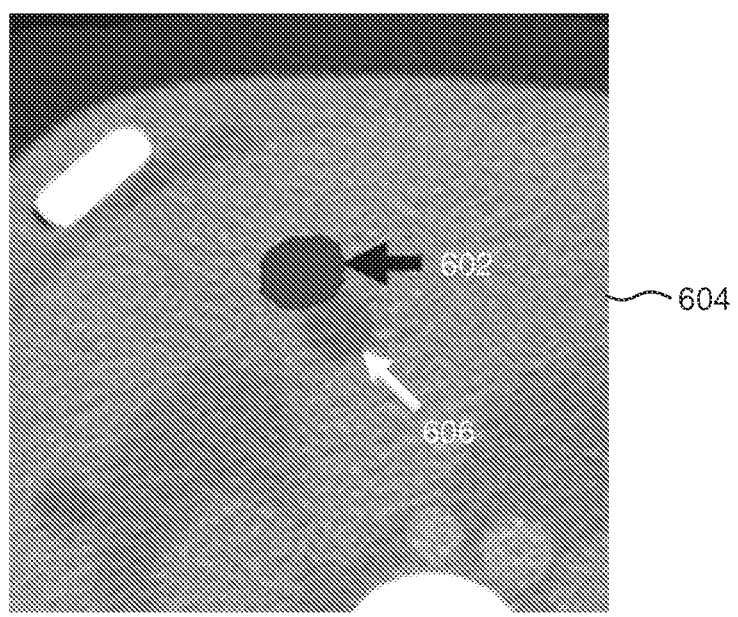
FIG. 5 is a 2D visualization of a virtual tumor generated in a CT image of a phantom.

Visualization of the SA in a simulated CT scan obtained after the ablation can be achieved by showing a slight enhancement in the region of the SA (for non-contrast CT), or slight reduction in perfusion in a simulated contrast CT in FIG. 5. In FIG. 5, a 2D visualization of a virtual tumor 602 is generated in a CT image of a phantom 604 next to an actual lesion 606 in the phantom 604.

For CT-fluoroscopy guidance simulation: The user selects which axial or oblique plane is currently imaged. The system provides (near-) real-time visual 2D simulation (e.g., 0.5 Hz to 4 Hz) of the VT and the tracked needle if they are intersecting with the selected image plane. The 2D visualization is accomplished in the same fashion as described above for intermittent CT; however, the image is degraded in resolution, contrast, and/or signal to noise ratio (SNR) to reflect the poorer fluoro-CT image quality.

The training system 100 can be modified to train users in using a navigation system to assist ablation guidance. A navigation system uses the spatial tracking system 104 to integrate the spatial coordinates of tracked medical devices with pre-acquired and real-time images. Using such a system for guidance can be trained by generating VTs, SAs, and providing evaluation feedback as described above, or visualizing in real-time the pose of the tracked needle, e.g., relative to a CT (or other 3D-) image of the phantom, relative to a real-time ultrasound image, or both.

The training system 100 may advantageously be provided without the integration of an actual ultrasound scanner 112. Instead of integrating an actual ultrasound scanner into the system, the use of ultrasound can be simulated by using a "dummy" ultrasound probe (106) that is spatially tracked, registered and calibrated like the actual probe described above, but is used to generate simulated 2D real-time ultrasound images using any of the following (or other) methods: 1) Pre-acquiring a full 3D ultrasound image of the phantom, and visualizing the 2D MPR of this 3D volume that the dummy-probe currently points to; and/or 2) generating synthetic 2D ultrasound images from a 3D CT or MR image of the phantom, by modifying to a more ultrasound-like texture and appearance the image MPR currently pointed to by the dummy probe.

In accordance with the present principles, training systems (100) with additional ablation-critical simulated tissue structures may be employed. For actual ablations, tissue structures other than the tumor can significantly affect the procedure. Thus, additional realism can be added by creating additional virtual tissue structures and simulating the affect that they have on ablation access or execution. For example, virtual blood vessels may be employed, such as, blood vessels that provide cooling (for RFA) or heating (for cryo-ablation) and can have an impact on the size/shape of the thermal lesion achieved with each ablation. Virtual blood vessels can be generated by creating an appropriate 3D shape (e.g. simple tube) near the VT, visualizing it as described above for the VT, and modifying the shape of any executed SA as a function of distance and orientation relative to the vessel.

Virtual bones may be employed as well. For actual ablations, bone cannot be penetrated by the ablation needle, and this determines possible needle paths from the skin to the PTV. Virtual Bone can be generated by creating appropriate 3D shapes, visualizing these shapes as described above for the VT, and disallowing penetration of that shape by the tracked needle by either providing visual feedback indicating that the current needle position or path is invalid, or attaching the needle to a haptic feedback system (e.g., the PHANTOM Omni® by SensAble Technologies™, Woburn, Mass.) and integrating the training system with the haptic feedback system such that progression of the needle through virtual bone is made impossible.

Training system 100 may be configured with haptic feedback systems or devices. Instead of using an actual tissue-mimicking phantom to insert the needle, a haptic feedback system (e.g., the PHANTOM Omni®) can be employed and integrated with the training system 100 to simulate the sensation of inserting a needle into tissue. This can be done in conjunction with the simulated ultrasound and/or CT imaging described above.

The present embodiments can be applied to train (interventional) radiologists, radiology fellows, clinicians, etc. to provide the technical skills needed to successfully plan and execute complex ablation procedures with conventional ultrasound, CT and/or other imaging and guidance systems with the assistance of a navigation system to track training progress and assess quantitatively the success of the training.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) no specific sequence of acts is intended to be required unless specifically indicated.

Having described preferred embodiments for systems and methods (which are intended to be illustrative and not limiting), it is noted that modifications and variations can be made by persons skilled in the art in light of the above teachings. It is therefore to be understood that changes may be made in the particular embodiments of the disclosure disclosed which are within the scope and spirit of the embodiments disclosed herein as outlined by the appended claims. Having thus described the details and particularity required by the patent laws, what is claimed and desired protected by Letters Patent is set forth in the appended claims.

The invention claimed is:

1. A training system, comprising:
a subject phantom configured for simulating a procedure and occupying a space capable of being visualized on a display;
a spatial tracking system configured to track an interventional instrument in subject phantom space; and
a simulation system configured to generate a simulated abnormality in images of the phantom space and to simulate interactions with the simulated abnormality to provide feedback and evaluation information to a user for training the user in an associated procedure related to the abnormality, wherein the feedback and evaluation information includes healthy tissue damaged and untreated abnormal tissue.

2. The system as recited in claim 1, wherein the simulation system includes a computer workstation configured with software to simultaneously display, on a display device, the subject phantom, the simulated abnormality and the interventional instrument in the subject phantom space.

3. The system as recited in claim 2, wherein the subject phantom space includes internal organs of a subject, the simulated abnormality includes a virtual tumor and the interventional instrument includes an ablation needle.

4. The system as recited in claim 2, wherein the software is configured to display treated areas of the abnormality responsive to interactions of the instrument.

5. The system as recited in claim 1, wherein the subject phantom includes at least one of a tissue-mimicking phantom and a haptic feedback system.

6. The system as recited in claim 5, wherein the subject phantom simulates internal organs including virtual blood vessels and bones.

7. The system as recited in claim 1, wherein the spatial tracking system includes an electromagnetic tracking system.

8. The system as recited in claim 1, wherein the simulation system includes images of the phantom space which are updated in accordance with a tracking probe.

9. The system as recited in claim 1, wherein the simulation system includes images rendered based on scans collected by scanning a body.

10. The system as recited in claim 9, wherein the scans include at least one of sonic scans, computer tomography scans and magnetic resonance scans.

11. The system as recited in claim 1, wherein the feedback and evaluation information includes volume of treated areas and volume of untreated areas.

12. A system for simulating aspects of an interventional ablation procedure, comprising:
a tissue-mimicking phantom compatible with ultrasound imaging;
a spatial tracking system configured to track a pose of at least one of an ultrasound probe and a needle probe; and
a computer workstation configured to run software, the software configured to acquire, process and display images from an ultrasound scanner in real-time, create and visualize in real-time virtual tumors in ultrasound images, and spatially track positions of the ultrasound probe and the needle probe relative to the virtual tumors visualized jointly with the image such that a simulated ablation performed at a location of the needle probe is visually displayed to provide training feedback for a user, wherein the software is configured to provide feedback on a number of simulated ablations performed, a duration of the procedure, and a volume or percentage of the virtual tumor covered.

13. The system as recited in claim 12, where the software is configured to compute a fraction of the virtual tumor that was covered by the simulated ablation.

14. A surgical training method, comprising:
simulating an abnormality in subject phantom space;
spatially tracking an interventional instrument in the subject phantom space;
performing a virtual procedure by simulating and displaying interactions between the interventional instrument and the abnormality simultaneously on a display; and
providing feedback and evaluation information to a user for training the user in the virtual procedure, wherein providing feedback and evaluation information includes providing volume of treated areas, volume of untreated areas, healthy tissue damaged, and untreated abnormal tissue.

15. The method as recited in claim 14, wherein the subject phantom space includes internal organs of a subject, the abnormality includes a virtual tumor and the interventional instrument includes an ablation needle.

16. The method as recited in claim 14, further comprising displaying treated areas of the abnormality responsive to interactions of the intervention interventional instrument.

17. The method as recited in claim 14, wherein the subject phantom includes at least one of a tissue-mimicking phantom and a haptic feedback system.

18. The method as recited in claim 14, further comprising updating images of the phantom space in accordance with a tracking probe.

19. The method as recited in claim 14, further comprising rendering images based on scans collected through imaging devices.

20. The method as recited in claim 19, wherein the scans include at least one of sonic scans, computer tomography scans and magnetic resonance scans.

* * * * *